United States Patent [19]

Hricak

[11] Patent Number: 5,331,807
[45] Date of Patent: Jul. 26, 1994

[54] AIR FUEL MAGNETIZER

[76] Inventor: Richard Z. Hricak, 11607 Nebel St., Rockville, Md. 20852

[21] Appl. No.: 161,022

[22] Filed: Dec. 3, 1993

[51] Int. Cl.$^5$ .......................... F02B 75/10; F01N 3/28
[52] U.S. Cl. ...................... 60/275; 123/538; 123/539; 422/171
[58] Field of Search ............ 123/536, 537, 538, 539; 60/275; 422/171, 177, 179, 211, 186.01

[56] References Cited

U.S. PATENT DOCUMENTS

| 3,349,354 | 10/1967 | Miyata | 123/536 |
| 3,830,621 | 8/1974 | Miller | 123/539 |
| 4,414,951 | 11/1983 | Saneto | 123/538 |
| 4,461,262 | 7/1984 | Chow | 123/536 |
| 4,568,901 | 2/1986 | Adam | 123/538 |
| 4,572,145 | 2/1986 | Mitchell et al. | 123/536 |
| 4,711,271 | 12/1987 | Weisenbarger et al. | 123/538 |
| 4,748,807 | 6/1988 | Vladimir | 422/179 |
| 4,755,288 | 7/1988 | Mitchell et al. | 123/538 |
| 4,808,306 | 2/1989 | Mitchell et al. | 123/538 |
| 5,048,498 | 9/1991 | Cardan | 123/538 |
| 5,129,382 | 7/1992 | Stamps et al. | 123/537 |
| 5,161,512 | 11/1992 | Adam et al. | 123/538 |
| 5,180,559 | 1/1993 | Ma | 422/171 |
| 5,238,558 | 8/1993 | Curtis | 123/538 |
| 5,271,369 | 12/1993 | Melendrez | 123/538 |

FOREIGN PATENT DOCUMENTS 1224418 4/1986 U.S.S.R. ................ 60/275

Primary Examiner—Tony M. Argenbright
Assistant Examiner—M. Macy
Attorney, Agent, or Firm—Leonard Belkin

[57] ABSTRACT

Apparatus for magnetically conditioning incoming air and fuel to an internal combustion engine to improve engine operation. The air and fuel, including diesel fuel, are subject to the lines of force from opposite poles of permanent magnets mounted on the air and fuel inlet lines. In another embodiment, to reduce unwanted emissions, the exhaust leading to the catalytic converter and the catalytic converter are subject to the magnetic fields from opposite poles of permanent magnets. Another embodiments provides for the use of magnets in furnaces to improve the efficiency and reduce unwanted emissions is such devices.

9 Claims, 2 Drawing Sheets

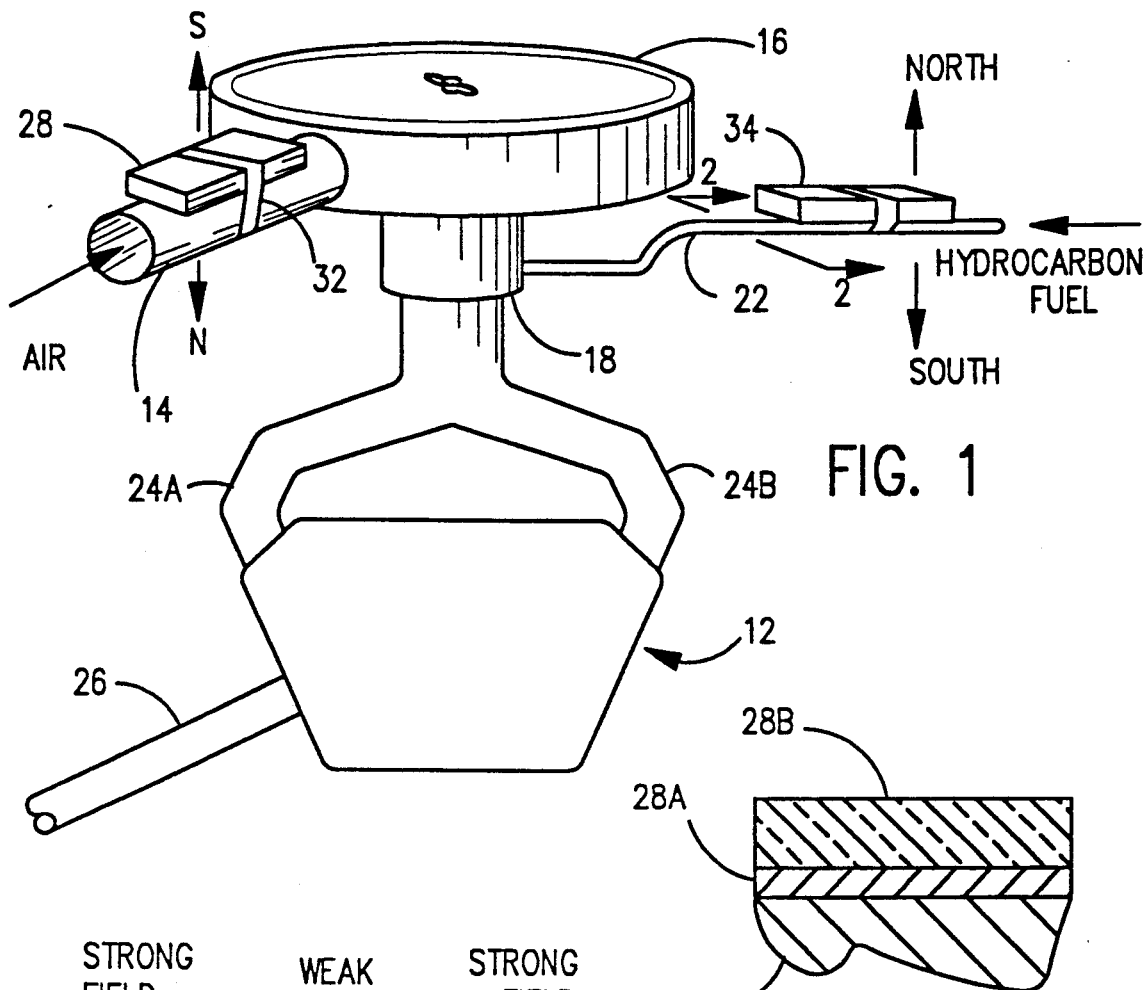
FIG. 1
FIG. 1A
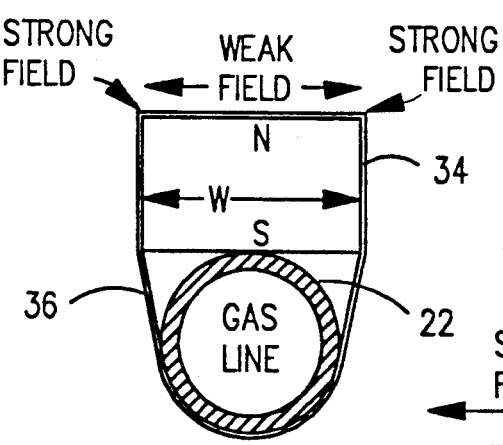
FIG. 2
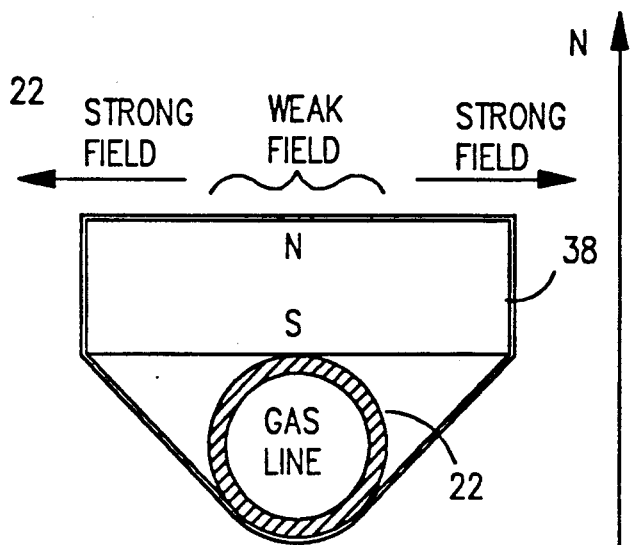
FIG. 3

AIR FUEL MAGNETIZER

BACKGROUND OF THE INVENTION

The present invention relates to magnetic air/fuel conditioning systems and more particularly to the use of magnets in the fuel and air intake lines of an internal combustion engine for reducing emissions and improving efficiency.

Currently regulated gas emissions from motor vehicles are unburned hydrocarbon (HC), carbon monoxide (CO), and oxides of nitrogen ($NO_x$).

Unburned HC and $NO_x$ react in the atmosphere to form photo-chemical smog. Smog is highly oxidizing in the environment and is the prime cause of eye and throat irritation, bad odor, plant damage, and decreased visibility. Oxides of nitrogen are also toxic. CO impairs blood capability to carry oxygen to the brain, resulting in slower reaction times and impaired judgement.

An examination of the art reveals a number of magnetic devices which have been produced to enhance the operation of internal combustion engines by application of static magnets and electromagnetic principles.

It is known that the use of permanent magnets on the fuel line of an automotive internal combustion engine for subjecting the fuel to a magnetic field will improve the performance of the engine and reduce unwanted emissions.

It also has been shown that subjecting incoming oxygen containing gas to a a magnetic field will also increase combustion efficiency.

A number of United States Patents show the use of magnets for improving the combustion of hydrocarbon fuels in engines.

U.S. Pat. No. 3,349,354 discloses the use of magnets to impose an electro magnetic field on flowing fuel. U.S. Pat. No. 3,830,621 teaches the use of magnets to impose a north magnetic field on the flowing oxygen containing gas to reduce unwanted emissions.

U.S. Pat. No. 4,414,951 describes a system in which the fuel line is subject to a magnetic field with alternating poles. U.S. Pat. No. 4,461,262 discloses a fuel treating device in which both the incoming air and fuel are subject to longitudinal magnetic fields with alternating poles.

U.S. Pat. No. 4,568,901 shows the use of magnets on a hydrocarbon fuel carrying duct for ionizing particles of the fuel, applying the south poles of the magnets. U.S. Pat. No. 4,711,271 describes the use of magnets to subject oil to a magnetic field to reduce the buildup of undesirable materials along the inside wall of the pipe.

U.S. Pat. No. 4,755,288 discloses the use of magnets to subject fuel to a magnetic force field with poles alternating. U.S. Pat. No. 5,129,382 describes the use of magnets to impose a magnetic field on the fuel to an engine with both poles of the magnetic adjacent the fuel conduit.

U.S. Pat. No. 5,161,512 has a helical array of magnets surrounding a fuel carrying conduit to concentrate the magnetic field on the flowing fluid.

None of the preceding patents teaches the present invention.

SUMMARY OF THE INVENTION

In this invention, further improvements in fuel efficiency and emission quality are obtained by the application of magnetic fields to internal combustion engine systems to both the fuel and the air being delivered to the engine.

In accordance with the principles of this invention, magnets of a specific design are arranged so that the flowing fuel is subject to the magnetic field adjacent one pole of a magnet while the incoming air is exposed to the magnetic field adjacent the opposite pole of a magnet.

In a preferred embodiment, one or more magnets are strapped to the fuel line as close as possible to the carburetor or fuel injectors with only one pole of the magnet or magnets adjacent to or in contact with the fuel line. One or more magnets are strapped to the air intake in such a way as to magnetically expose the oxygen to the magnetic field emanating from the pole opposite that of the pole used to expose the fuel.

It is believed that the fuel and oxygen are oppositely polarized or ionized, with the result that the fuel and oxygen exhibit a stronger attraction to each other with the consequence that there is more efficient and complete bonding to each other during the combustion process.

In another preferred embodiment of this invention, a reduction in pollutants emitted by the engine is accomplished by subjecting the exhaust gasses entering the catalytic converter and those gasses in the converter to magnetic fields adjacent the opposite poles of one or more magnets.

In still another preferred embodiment of this invention, the same principles are applied to home or industrial heating systems regardless of whether the fuel employed is oil, gas, propanec, etc.

It is thus a principal object of this invention to utilize magnetic fields to improve the operation of internal combustion engines.

Other objects and advantages of this invention will hereinafter become obvious from the following description of preferred embodiments of this invention.

BRIEF DESCRIPTION OF THE DRAWINGS

FIG. 1 is a schematic illustration of a preferred embodiment of this invention incorporated into an automotive internal combustion engine.

FIG. 1a is a partial cross section of a magnet shown in FIG. 2.

FIG. 2 is a section taken along 2—2 of FIG. 1.

FIG. 3 is a section similar to that of FIG. 2 except that it shows an oversized magnet.

DESCRIPTION OF THE PREFERRED EMBODIMENTS

Figure 4:
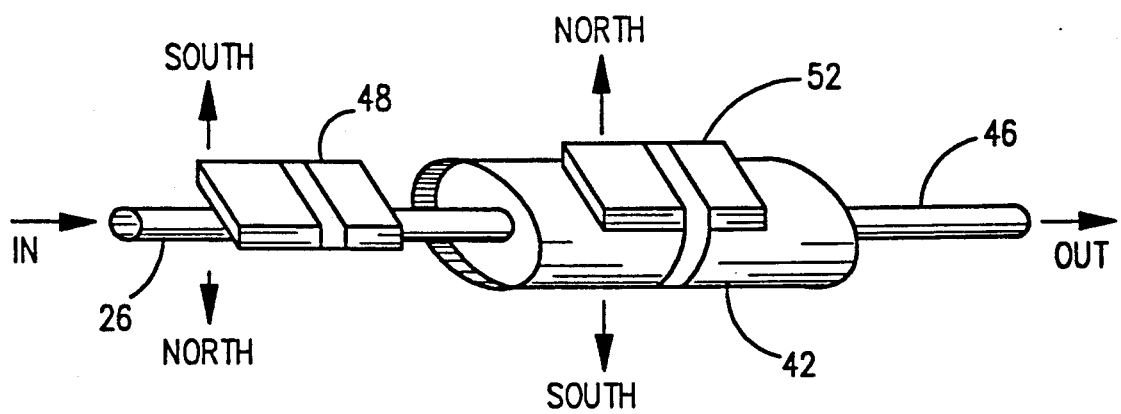
FIG. 4 is a schematic illustration of another embodiment of this invention as applied to a catalytic converter.

Referring to FIG. 1, there is illustrated an internal combustion engine 12 provided with an air inlet manifold 14, an air filter 16, a carburetion or fuel injection device 18 hereinafter referred to as a carburetor, a fuel line 22 carrying a hydrocarbon liquid fuel to carburetor 18, and engine fuel-air mixture intake manifolds 24a and 24b. The products of combustion are discharged from engine 12 through an exhaust pipe 26.

In accordance with the principles of this invention, magnetic fields are applied to the incoming air and the incoming fuel in the manner to be now described.

Mounted on air manifold 14 is a permanent bar magnet 28 attached on one side of manifold 14 with a strap 32 of suitable material such as a fabric, aluminum, or plastic.

Magnet 28 has the shape of a right angle parallelepiped with the opposite flat sides or faces containing the poles of the magnet. The face with the north pole is adjacent manifold 14 while the face with the south pole is on the side of magnet 28 opposite that of manifold 14 as indicated by the arrows. Hence, the entering air within manifold 14 is exposed to the magnetic lines of force radiating from the north pole of the magnet.

Magnet 28 provides a magnetic field of at least approximately 500 gauss, but preferably about 1500 or more gauss, to produce the effectiveness desired in this invention.

In order to protect magnet 28 from the effects of heat generated by engine 12, it will be seen from FIG. 1a that magnet 28 is provided with insulation which would include a layer of aluminum 28a to block radiant energy and a layer of thermal insulation 28b to prevent heating by conduction and radiation.

Referring also to FIG. 2, a bar magnet 34 is mounted on fuel line 22 leading into carburetor 18.

Magnet 34 is a permanent bar magnet held in place by a strap 36 of suitable non-magnetic material. Magnet 34 is similar in construction, including the insulation, to that of magnet 28 being a right angle parallepiped with the face in contact with pipe 22 being the south pole of the magnet as shown by the arrows.

The width w of magnet 34 is not in excess of the diameter or cross section of pipe 22 for reasons which will now be described in connection with FIG. 3 which shows a similarly constructed magnet 38 mounted on pipe 22. However, in FIG. 3, magnet 38 has a width which is greater than the diameter of pipe 22. It is known that in a magnet of this shape the magnetic fields adjacent the edges are more intense than the fields located adjacent intermediate areas of the faces. For example, in one magnet which was measured as to its magnetic field it was discovered that the maximum intensity of the fields adjacent the edges was 1100 gauss while at an intermediate location the field dropped off to 800 gauss. Hence, as is illustrated, a good portion of the magnetic field produced by the magnet goes to waste.

It should also be noted that the exposure of the liquid hydrocarbon fuel flowing in line 22 to the magnetic field is more critical to the effectiveness of this invention because there is a smaller amount of liquid in terms of volume compared to the gaseous supply of oxygen in air. Also, the cross section of line 22 carrying the liquid fuel is much smaller than the cross section of manifold 14 containing the air requiring a more intense application of the magnetic field. Because of the larger cross section of the air manifold, the air manifold would be provided with at least two magnets for each one on the fuel line.

Magnet 34 should have an intensity of at least 500 gauss, but preferably at least 1100 gauss and above to work effectively in accordance with the principles of this invention.

It is also critical that the air and fuel flows be subject to opposite polarities of the magnets, referred herein to as a bipolar arrangement or configuration, so that if the air is subject to the magnetic field adjacent the north pole of the magnet then the fuel must be subject to the magnetic field adjacent the south pole of the magnet, and vice versa.

The resultant conditioned fuel/air mixture magnetized in opposite polarities burns more completely, producing higher engine output, better fuel economy, more power and most importantly reduces the amount of hydrocarbons, carbon monoxide and oxides of nitrogen in the exhaust.

Another benefit of this invention is that magnetically charged fuel and air molecules with opposite polarities dissolve carbon build-up in carburetor jets, fuel injectors, and combustion chambers help to clean up the engine and maintain the clean condition.

The preferred embodiment described above is equally useful where the engine employs a carburetor or fuel injection, with the fuel magnet being mounted on the fuel line leading to the carburetor or injectors, including the use of diesel fuel.

EXAMPLE

The above invention was tested on a 1988 Chrysler Le Baron with fuel injection. 1100 gauss magnets were mounted on the air and fuel inlet lines in a bipolar configuration. It was discovered that there was a substantial reduction in the hydrocarbons found in the exhaust and that there was also a noticeable improvement in engine performance, such as faster starting and greater acceleration, and miles per gallon.

The principles of this invention are also applicable to improve the efficiency of the catalytic converter whose purpose is primarily to oxidize any remaining carbon monoxide to carbon dioxide.

Referring to FIG. 4, there is shown catalytic converter 42 connected to receive the exhaust products from engine 12 through exhaust pipe 26 and discharge through pipe 46 to a muffler (not shown).

Bar magnets 48 and 52 of design similar to those described earlier, including the insulation, are mounted on pipe 26 and converter 42, respectively, as illustrated, in a bipolar arrangement.

In the illustrated arrangement, magnet 48 is mounted with the face containing the north pole in contact with exhaust pipe 26 whereas magnet 52 has its south pole facing catalytic converter 42. If desired, the magnets may be reversed as long as the bipolar arrangement is preserved.

The arrangement of the magnets shown in FIG. 4 can be used alone or in combination with the fuel-air conditioning system illustrated in FIGS. 1-3.

Figure 5:
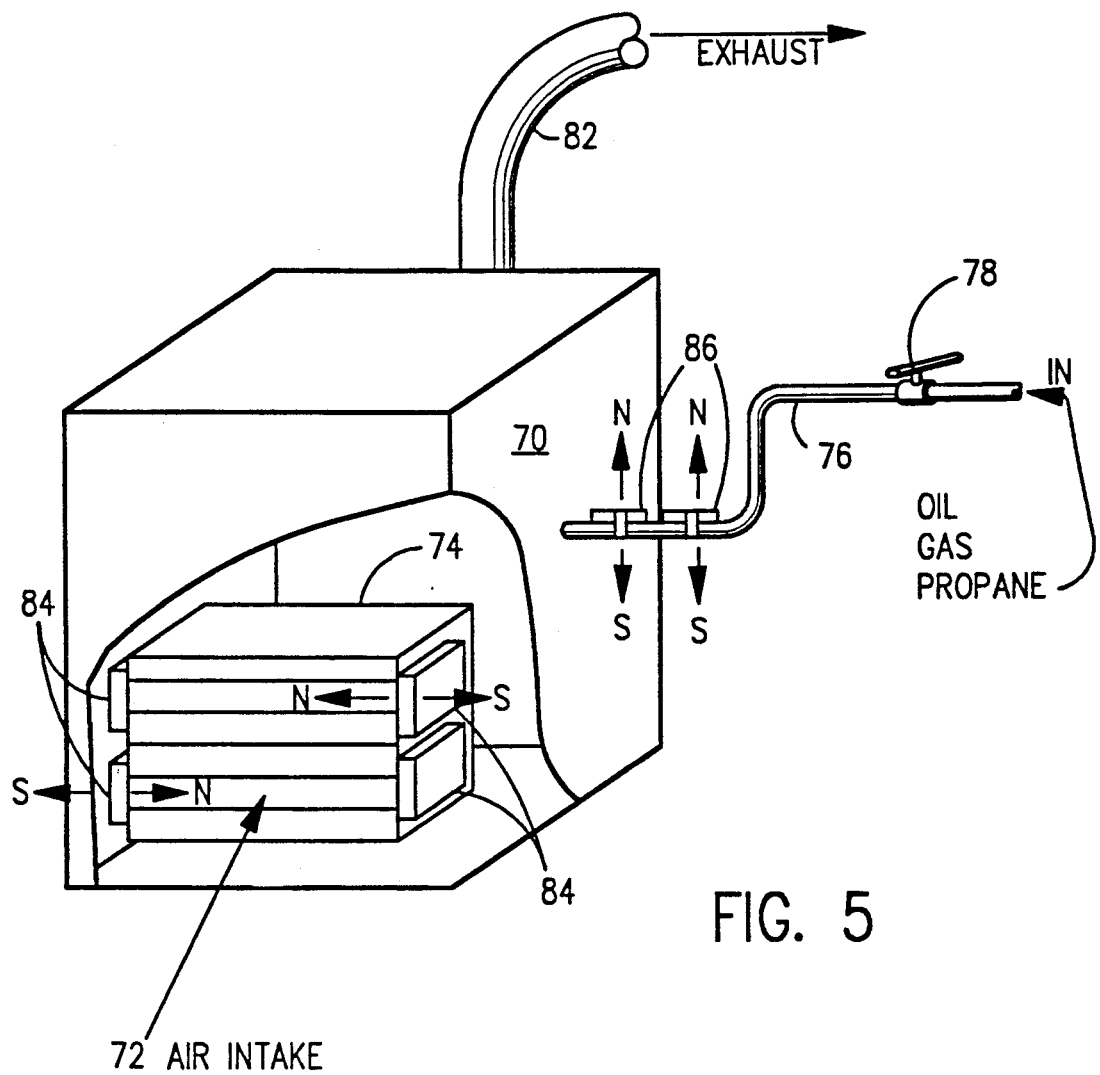
FIG. 5 is a schematic illustration of still another embodiment of this invention as applied to a home or industrial heating system.

Referring to FIG. 5, in another preferred embodiment, the principles of this invention are shown applied to a home or industrial heating system.

Illustrated is a furnace 70 having an air inlet 72 connected to an air manifold 74 within furncace 70, a fuel inlet line 76 with a shut off valve 78, and an exhaust manifold 82 to carry away the products of combustion.

As is understood in the art, furnace 70 may be employed to heat air or water (not shown) to be distributed for residential or industrial heating purposes. In addition, furnace 70 may burn any hydrocarbon fuel such as oil, gas, and propane.

Mounted on air mainifold 74 are a plurality of bar magnets 84 of the type previously described. Mounted on fuel inlet line 76 are similar bar magnets 86. The magnets are mounted in a bipolar arrangement, for example, with magnets 84 having their north poles facing the incoming air and magnets 86 having their south poles facing the incoming fuel. If desired, the opposite arrangement of the poles may be employed provided the bipolar arrangement is maintained. The magnets would be at least 500 gauss and preferably about 1500 gauss.

It is thus seen that there has been provided unique arrangements and method for improving the operation of internal combustion engines and furnaces, reducing unwanted emissions, and improving generally the efficiency of such systems.

While only certain preferred embodiments of this invention have been described, it is understood that many variations are possible without departing from the principles of this invention as defined in the claims which follow.

What is claimed is:

1. Apparatus for the conditioning of air and fuel being supplied to an internal combustion engine having a hydrocarbon fuel inlet line and an air inlet line comprising:
   a. first permanent magnet means mounted on said air inlet line, said magnet means having the shape of a parallepiped with one face containing only one pole of said magnet means adjacent said air inlet line and the magnetic lines of force extending from said one face passing through said air inlet line, the other pole being contained within the face opposite that of said one face of said magnet means, the magnetic lines of force extending from said other pole being directed away from said air inlet line thereby the air flowing through said air inlet line being exposed only to the magnetic field emanating substantially from only one pole;
   b. second permanent magnet means mounted on said fuel inlet line, said second magnet means having the shape of a parallepiped with one face containing only one pole of said magnet means from which the magnetic lines of force extend into and through the fuel within said fuel inlet line, the opposite pole of said second magnet means being located in the opposite face of said second magnet, the magnetic lines of force extending therefrom being directed away from said fuel inlet line so that the fuel flowing in said fuel inlet line is subject to the magnetic field from substantially only one pole; and
   c. the first and second permanent magnet means being in a bipolar arrangement so that the incloming air and fuel are subject to the magnetic fields from opposite poles.

2. The apparatus of claim 1 in which the width of the magnet on said fuel line is no larger than the cross section of said fuel line.

3. The apparatus of claim 2 in which the strength of the magnets is at least 500 gauss.

4. The apparatus of claim 1 in which said engine is provided with a catalytic converter and means to transfer the combustion products of said engine to said converter, and means to subject said exhaust products leading to said converter and said converter to opposite magnetic fields.

5. The method of magnetically conditioning incoming oxygen and hydrocarbon fuel in an internal combustion engine having a hydrocarbon fuel inlet line and an air inlet line comprising the steps of mounting first and second permanent magnet means on said fuel and air inlet lines, respectively, in a bipolar arrangement, each of said magnet means having the shape of a parallepiped with one face containing only one pole of said magnet means from which the magnetic lines of force extend through said fuel and air in said fuel and air inlet lines, respectively, the other pole of each magnet means being contained within the face opposite said one face of each said magnet means, the magnetic lines of force extending from said other pole in each magnet means being directed away from said fuel and air inlet lines, respectively, in order to condition the incoming fuel and air with the magnetic field from opposite magnetic poles.

6. The method of claim 5 in which the width of the magnetic means mounted on the fuel inlet pipe is no larger than the cross section of said inlet pipe.

7. The method of claim 6 in which said magnet means are at least 500 gauss.

8. Apparatus for the conditioning the exhaust products of an internal combustion engine utilizing a hydrocarbon fuel having an exhaust pipe carrying the combustion products from said engine, a catalytic converter for receiving said combustion products from said exhaust pipe for oxidizing some of the combustion products, comprising:
   a. first permanent magnet means mounted on said exhaust pipe, said magnet means having the shape of a parallelepiped with one face containing only one pole of said magnet means adjacent said exhaust pipe and the magnetic lines of force extending from said one face passing through said exhaust pipe, the other pole being contained within the face opposite that of said one face of said magnet means, the magnetic lines of force extending from said other pole being directed away from said exhaust pipe thereby the combustion products flowing through said exhaust pipe being exposed only to the magnetic field emanating substantially from only one pole;
   b. second permanent magnet means mounted on said catalytic converter, said second magnet means having the shape of a parallelepiped with one face containing only one pole of said magnet means from which the magnetic lines of force extend into and through the interior of said converter, the opposite pole of said second magnet means being located in the opposite face of said second magnet means the magnetic lines of force extending therefrom being directed away from said converter so that the interior of said catalytic converter is subject to the magnetic field from substantially only one pole; and
   c. the first and second permanent magnet means being in a bipolar arrangement so that the exhaust products in said exhaust pipe and the interior of said catalytic converter are subject to the magnetic fields from opposite poles.

9. The apparatus of claim 8 in which said engine has an air inlet and a fuel inlet, each of said inlets being exposed to opposite magnetic fields.

* * * * *